(12) United States Patent
Bell

(10) Patent No.: US 10,849,457 B2
(45) Date of Patent: Dec. 1, 2020

(54) PORTABLE THREE-IN-ONE FOOD GRILLER, FOOD SMOKER AND FIRE PIT

(71) Applicant: Paul David Bell, Abilene, TX (US)

(72) Inventor: Paul David Bell, Abilene, TX (US)

(*) Notice: Subject to any disclaimer, the term of this patent is extended or adjusted under 35 U.S.C. 154(b) by 90 days.

(21) Appl. No.: 16/185,568

(22) Filed: Nov. 9, 2018

(65) Prior Publication Data

US 2020/0146505 A1 May 14, 2020

(51) Int. Cl.
*A47J 37/07* (2006.01)
*F24C 1/16* (2006.01)
*F24B 1/182* (2006.01)
*A47J 37/06* (2006.01)
*F24B 1/20* (2006.01)

(52) U.S. Cl.
CPC ....... *A47J 37/0713* (2013.01); *A47J 37/0647* (2013.01); *A47J 37/0763* (2013.01); *F24B 1/182* (2013.01); *F24B 1/207* (2013.01); *F24C 1/16* (2013.01); *A47J 37/0682* (2013.01); *A47J 2037/0777* (2013.01); *A47J 2037/0795* (2013.01)

(58) Field of Classification Search
CPC .................................................. A47J 37/0713
USPC .................................. 126/9 R, 25 R; 99/340
See application file for complete search history.

(56) References Cited

U.S. PATENT DOCUMENTS

| | | | | |
|---|---|---|---|---|
| 2,813,656 A * | 11/1957 | Anderson | ............ | B65D 21/046 206/507 |
| 3,765,397 A * | 10/1973 | Henderson | .......... | A47J 37/0763 126/25 R |
| 4,957,039 A * | 9/1990 | Reyes | .................. | A47J 37/0704 126/25 R |
| 5,216,947 A * | 6/1993 | Cheng | ..................... | A47J 27/05 126/348 |
| 5,891,498 A * | 4/1999 | Boehler | ................. | A23B 4/052 426/314 |
| 5,992,307 A * | 11/1999 | Parker | ................. | A47J 37/0713 126/20 |
| 6,016,797 A * | 1/2000 | Nowicke, Jr. | ....... | A47J 37/0704 126/25 R |
| 6,543,435 B1 * | 4/2003 | Regen | ................. | A47J 37/0704 126/25 R |
| 2010/0024798 A1 * | 2/2010 | Sampson | ............ | A47J 37/0786 126/25 R |

* cited by examiner

*Primary Examiner* — Avinash A Savani

(57) ABSTRACT

The apparatus is a portable three-in-one food griller, food smoker and fire pit in which the sidewalls can nest into a compact self-contained unit for easy transportation. In one variation, there are five rectangles with four walls that encompass a void that can be configured and stacked for use as a grill, a smoker or a fire pit. The bottom rectangle can contain an adjustable air inlet door and a grate for holding a fire source. The top rectangle can contain an adjustable air outlet door in the ceiling with a thermometer. The second, third and forth rectangles can contain various configurations of grates for grilling food, smoking food or use as a fire pit. After use, rectangles two through five can fit and nest into the first rectangle (the base) and be latched to the floor section forming a self-enclosed compact and transportable rectangle box with a carrying handle.

17 Claims, 12 Drawing Sheets

114

PORTABLE THREE-IN-ONE FOOD GRILLER, FOOD SMOKER AND FIRE PIT

FEDERALLY SPONSORED RESEARCH

Not Applicable

REFERENCE TO A "MICROFICHE APPENDIX"

Not Applicable

BACKGROUND

This invention pertains to outdoor cooking devices and in particular to portable outdoor cooking devices. Persons of all backgrounds and socio-economic backgrounds enjoy grilling food, smoking food and sitting around a fire pit. There is a multitude of grilling and smoking cooking devices intended for permanent installation in the backyard patio. These grills and smokers come in a variety of sizes, most of them capable of preparing copious amounts of meats and vegetables. However, the market lacks a quality outdoor grill/smoker that is compact enough to fit into the trunk of a small size sedan and versatile enough to satisfy an expert in outdoor food grilling or smoking.

Outdoor cooking devices utilize a variety of fuels: gas, propane, wood, charcoal and lump charcoal to name a few. Some devices specialize in grilling, others smoking food. Outdoor cooking devices large enough to prepare multiple food items are not portable and often not movable. Therefore, grilling and smoking food is limited to non-portable, patio based devices.

However, people are on the go. Camping, tail-gating, and picnics are some examples of people's desire to grill and smoke food. In this regard, portable devices presently on the market that can grill and smoke are very limiting to the outdoor cook. Portable grills are available in the market, but they are small in cooking surface and very limiting in size. Portable smoking devices that can control cooking temperature and have sufficient cooking surface are non-existent.

In order for the outdoor cook to fully enjoy his art, he or she must be able to use a variety of fuel sources and control the heat and smoke in the device. Smoking must be done at low temperatures to satisfy the cook. Cooks often expect to grill at high heats to meet their expectations. No portable device on the market comes close to meeting the four key elements contained in the portable three-in-one griller/smoker/fire pit: 1) Sufficient cooking surface size, 2) Air tight cooking chamber to control the heat at lower temperatures for smoking and 3) Providing a very hot cooking temperature for grilling, and 4) Portability and ease of use.

Previous patents have been issued in regard to portable outdoor cooking grills and/or cooking smoker. U.S. Pat. No. 9,657,950 meets the criteria for portability. However, because the walls completely disassemble and connect with tabs, the device fails the criteria of the portable three-in-one griller/smoker/fire pit with regard to being air tight. Quality food grilling/smoking requires an air tight cooking chamber and adjustable air flows below and above the fuel source in order to keep the desired temperature.

U.S. Pat. No. 6,584,967 B1 is portable and suitable for grilling food. However, it lacks walls or side altogether. The absence of an air tight cooking chamber eliminates its use as a food smoker and severely limits its usefulness as a food grill.

U.S. Pat. Nos. 4,508,096 and 5,605,726 meet the criteria for a portable grilling device. However, they fail in regard to having an air tight cooking chamber with adjustable air flow. Those trained in the art of food smoking and grilling understand that only when air flow both below the fuel source and above the fuel source are adjustable can quality grilled and/or smoked food be attained. The portable three-in-one griller/smoker/fire pit excels in this aspect of outdoor cooking.

U.S. Pat. No. 10,058,210 B2 meets the criteria of air and temperature control by the use of a venturi valve(s). However, the device is not portable nor is it intended to be portable. U.S. Pat. No. 5,531,154 is an effective grill and smoker, but is not portable being intended for patio use only.

Fire pits are a popular product on the market today. Fire pits contain burning wood pieces and keep the fire contained as well as provided easy cleanup. Campers in particular would enjoy a portable fire pit that burns wood efficiently and contains fires in a safe manner. A top functioning fire pit provides an air source from below the wood fire source. This creates a hotter fire, ignites the fuel completely and makes clean up of the ashes easy. U.S. Pat. No. 5,960,788 illustrates a movable outdoor fire pit. However, it fails in regard to the portability in which the portable three-in-one griller/smoker/fire pit excels.

What is needed in the art of outdoor cooking and outdoor living is a portable device that is compact and able to fit into small places such as a car trunk and also provides ample cooking surface and temperature control such that grilling and smoking food is equivalent in quality to patio cooking devices. When such a device is also able to act as an efficient fire pit, the outdoor experience would be complete.

BRIEF SUMMARY

The present disclosure presents various embodiments, features, aspects, functions, characteristics, etc. of a portable three-in-one griller/smoker/fire pit. In general, embodiments include a stack of five rectangular walls that encompass a void. The sections stack one upon the other by resting on a ledge protruding into the inner void of each walled rectangle. Movable steel grates can rest upon the ledge of each section and be configured according to the user's needs. An exemplary embodiment of the three-in-one griller/smoker/fire pit can be described as a portable full size grill, smoker and fire pit constructed of light weight metal such as stainless steel or aluminum.

The three-in-one grill/smoker/fire pit is aspirated through the use of two or more sliding doors. One such door is located on the base of the unit below the grate upon which rests the cooking fuel such as wood or lump wood coal. Another such door is located on the top section allowing the escape of air and complete air circulation. Sliding doors regulate the burn rate and hence the temperature of the portable three-in-one griller/smoker/fire pit. When fully opened the sliding doors allow ample to air flow to completely ignite logs when being used as a fire pit.

In a particular embodiment, the three-in-one griller/smoker/fire pit is constructed of stainless steel. In another embodiment, the three-in-one griller/smoker/fire pit is constructed of cast aluminum. According to the needs of the art, the three-in-one griller/smoker/fire pit can be made of any variety of material.

One advantage of the various embodiments of the three-in-one griller/smoker/fire pit is that one device serves three needs of the outdoor cooker and enthusiast in a portable format. This unique combination serves the need of the outdoor griller who needs a large cooking area and a hot fire. The three-in-one griller/smoker/fire pit serves the needs of the outdoor smoker by providing a large cooking surface, smoke infusion and low temperature control, as well as a using a variety of smoke sources such as chips or pellets. And in a unique addition, the device can be configured to hold full size wood logs and be used as a fire pit. The unique scope of the three-in-one griller/smoker/fire pit is that each of its configurations produces quality results that are equal to or nearly equal to a home patio apparatus that is heavy, permanent and non-movable. The market will embrace the three-in-one griller/smoker/fire pit because it is compact, easy to transport, light-weight, quickly assembled for use, and functions in high quality in three separate ways.

Further features, advantages, characteristics, aspects, etc., that can be incorporated into various embodiments of the three-in-one griller/smoker/fire pit are presented in the following description, with reference being made to the various drawings.

DETAILED DESCRIPTION OF EMBODIMENTS OF THE INVENTION

The presently described embodiments, as well as features and aspects thereof, is directed towards a three-in-one griller/smoker/fire pit.

Figure 1:
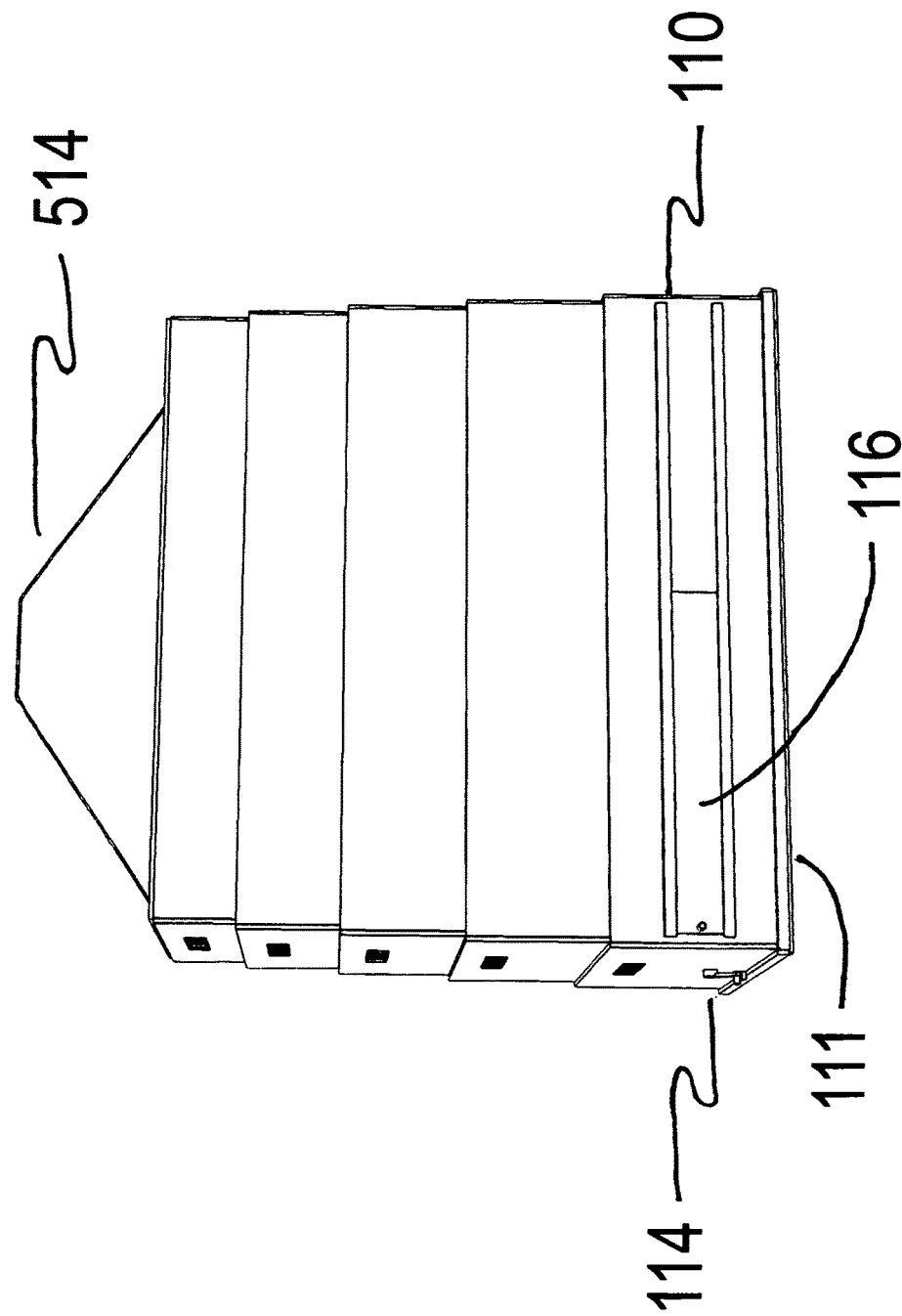
FIG. 1 is a perspective drawing of one embodiment of the three-in-one grill/smoker/fire pit.

FIG. 1 is a perspective drawing of one embodiment of the portable three-in-one griller/smoker/fire pit. The three-in-one griller/smoker/fire pit is illustrated as including a base 110, and a base floor section 111. The air intake door enables air control and temperature control within the cooking chamber 116. In some embodiments, the base can be a rectangle, a square, a circle or an oval. The shapes presented herein, although they may be considered as novel, are not limiting, but rather exemplary.

Figure 2:
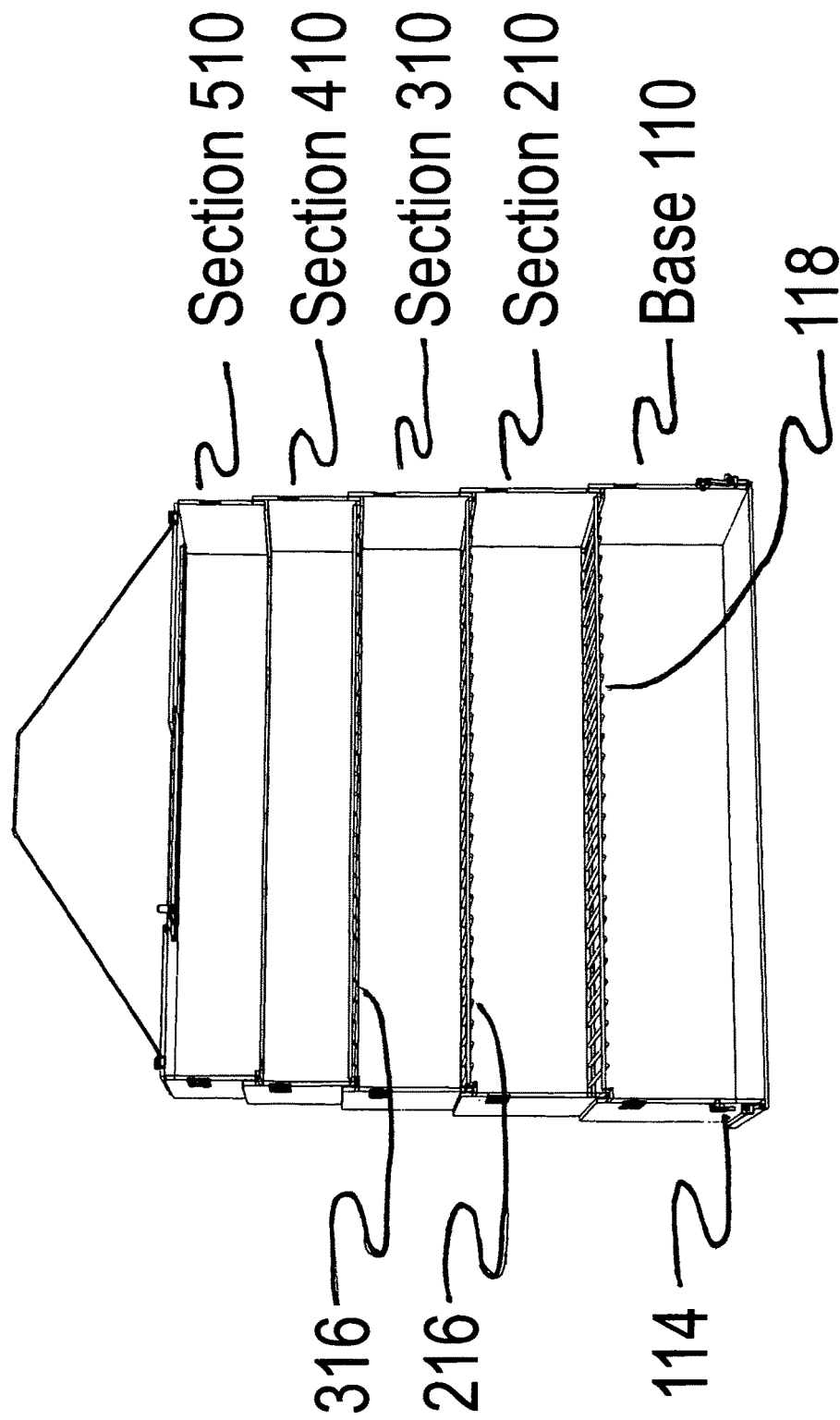
FIG. 2 is a cross sectional drawing of the embodiment.

FIG. 2 is a cross-sectional view of the portable three-in-one griller/smoker/fire pit. In some embodiments there are five sections as shown in FIG. 2. Other embodiments can include more or fewer nesting sections. The sections, plus the floor encompass a void in which, when employing grates, are capable of grilling food, smoking food and burning wood as a fire pit. FIG. 1 and FIG. 2 taken together describe the elements of the portable three-in-one griller/smoker/fire pit.

The Base and Nesting Sections

The base 110 operates as a fire pit and base container for the nesting sections two through five. FIG. 2 118 illustrates the fire grate which rests upon a ledge of the Base 110. The base contains a sliding door which functions as an air inlet FIG. 1 116.

The base 110 rests upon and nests into the floor 111. The floor functions to enclose the fire and fuel source, and contain ashes and waste. When the three-in-one griller/smoker/fire pit is nested into the base 110 for portable transportation, the floor 111, latches onto the base with latches 114. When the pyramid sections are nested into the base and latched to the floor, the three-in-one griller/smoker/fire pit is a portable self-contained unit FIG. 03. The ledges protruding inward to the cooking chamber act as a stop to contain the sections below 120.

The base 110 in FIG. 02 contains a ledge that protrudes from the inner wall into the void comprising the cooking chamber which the base encompasses. The ledge supports a grate resting upon it 118 and also section two 210 rests upon the ledge. The grate 118 rests upon the ledge and can be constructed of various metal materials in various embodiments.

Section two of the three-in-one smoker/fire pit 210 rests upon and nests into a ledge of the base 110 and sits atop the grilling grate 116. The outside wall perimeter of section two 210 nests inside the inner wall perimeter of base 110 and rests upon the ledge forming a movable, but snug fit. Friction and gravity connect section two 210 with the base section 110. The depth in which section two 210 fits down into the base 110 firmly connects the two sections and can vary in different embodiments.

Section three 310 rests upon and nests into the ledge of section two 210 and sits atop the grilling grate 216 of section two 214. The outside wall perimeter of section three 310 nests inside the inner wall perimeter of section two 210 and rests upon the ledge forming a movable, but snug fit. Friction and gravity connect section three 310 with section two 210 and the base 110. The depth in which section three 310 fits down into the base 210 firmly connects the two sections and can vary in different embodiments.

Section four 410 rests upon and nests into the ledge of section three 310 and rests atop the grate 316. The outside wall perimeter of section four 410 nests inside the inner wall perimeter of section three 310 and rests upon the ledge forming a movable, but snug fit. Friction and gravity connect section four 410 with section three 310, section two 210 and the base 110. The depth in which section four 410 fits down into the section four 410 firmly connects the two sections and can vary in different embodiments.

Figure 7:
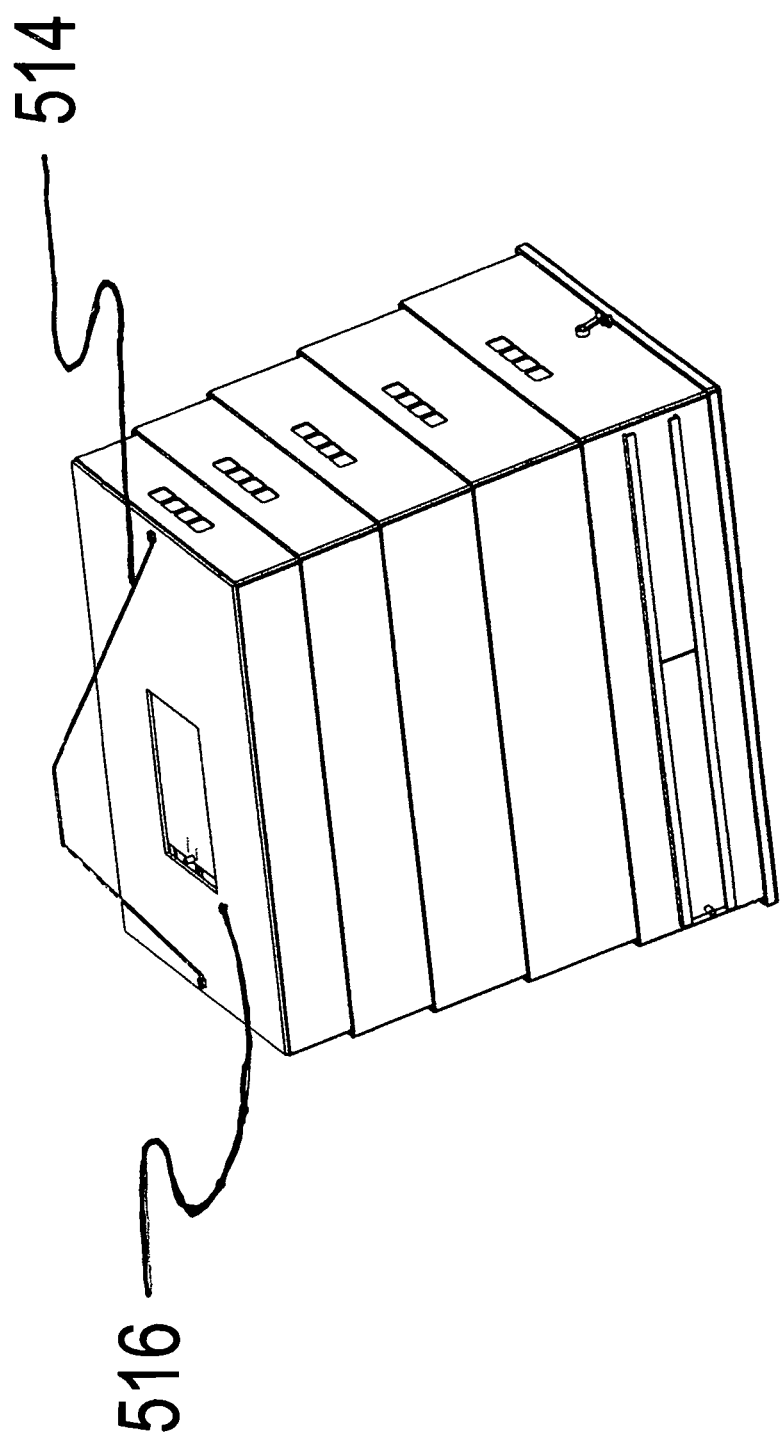
FIG. 7 is a detail drawing of the air door and handle of the top section.
Figure 8:
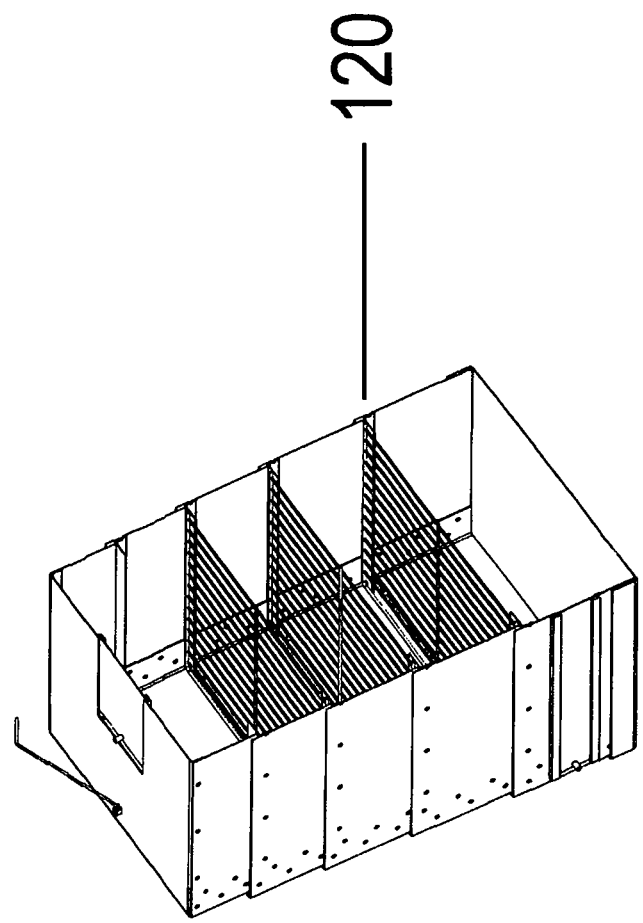
FIG. 8 is a cross sectional drawing showing the nesting and stacking formation of the grates and sections.
Figure 9:
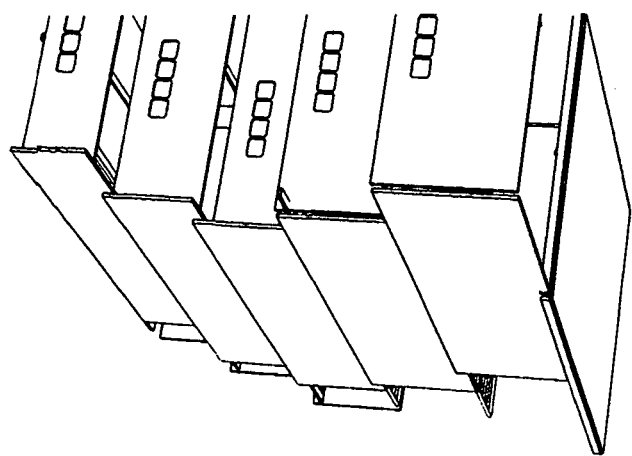
FIG. 9 is an exploded view of the three-in-one grill/smoker/fire pit.
Figure 10:
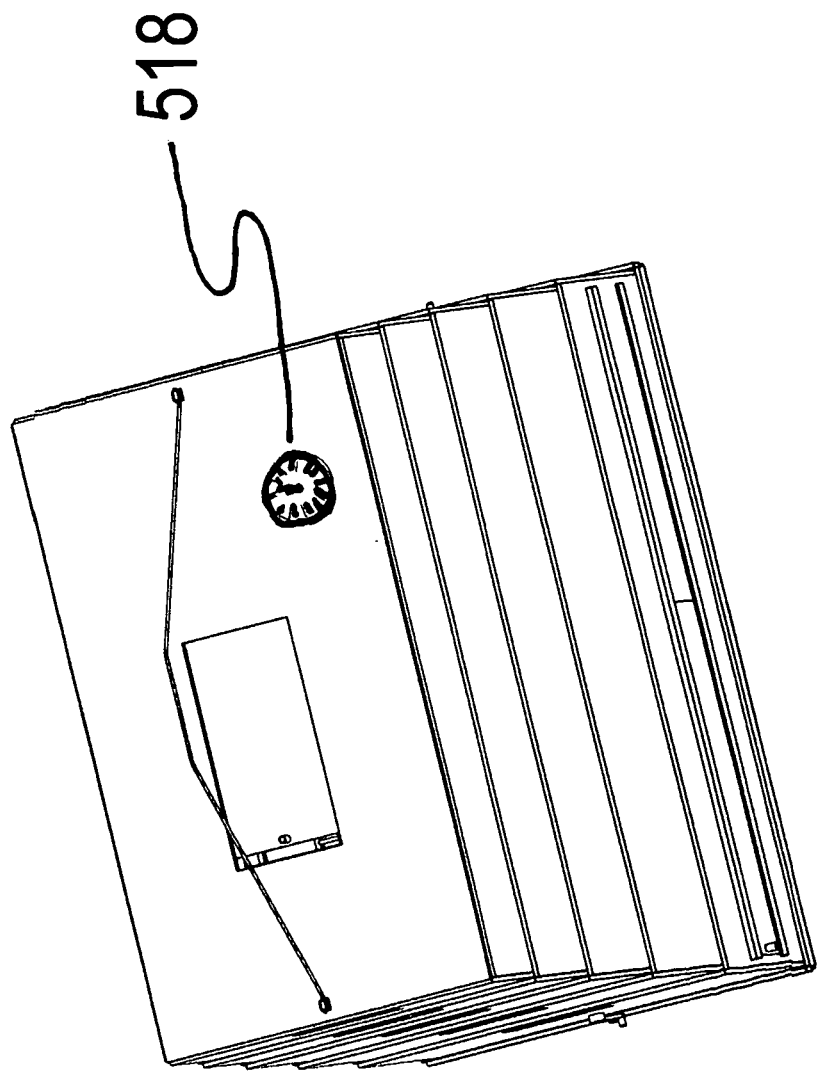
FIG. 10 is a perspective view of section five containing the cooking thermometer.
Figure 11:
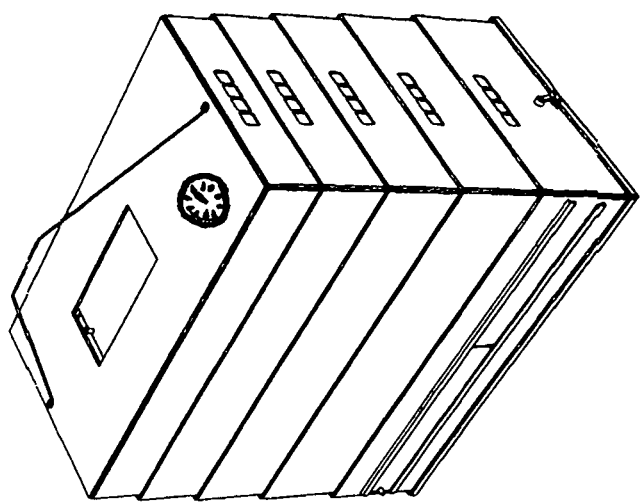
FIG. 11 is a perspective view of the three-in-one grill/smoker/fire pit.
Figure 12:
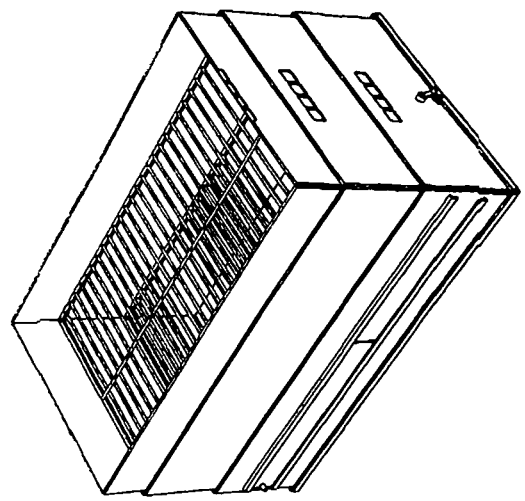
FIG. 12 is perspective view of the three-in-one grill/smoker/fire pit configured as a fire pit.

Section five 510 rests upon and nests into the ledge of section four 410. The outside wall perimeter of section five 510 nests inside the inner wall perimeter of section four 410 and rests upon the ledge forming a movable, but snug fit. Friction and gravity connect section five 510 with section four 410, with section three 310, section two 210, and the base 110. The depth in which section five 510 fits down into the section four 410 firmly connects the two sections and can vary in different embodiments. Section five contains a sliding door which functions as an air outlet FIG. 7 516. Section five contains a swinging handle FIG. 7 514 which lifts section 5 during cooking operations and lifts the entire three-in-one griller/smoker/fire pit when nested together for transport. Section five houses a cooking thermometer in the ceiling section FIG. 10 518.

All sections of the three-in-one griller/smoker/fire pit can be lifted away from and removed from any section upon which it rests. As can be appreciated in the art, the sections fit together snuggly to form an air tight void, or a nearly air tight void. Air flow is controlled by the sliding doors in the base section 116 and section five 516. Although each section fits snuggly, there exists sufficient space for each section to slide out of and away from other sections. The ledge of each section can protrude upward at a slight angle or protrude at a 90 degree angle, providing a snug fit caused by friction and the gravity pull of the section above it.

It can be appreciated that other embodiments might use different means to create a snug connection between the nesting sections. Latches, pins, clips, bumps, buttons, and rough ridges are only a few examples of how other embodiments can create connection between the nesting sections. This embodiment is for illustration only and is not intended to limit the scope of this invention in any manner.

The multiple sections of the three-in-one griller/smoker/fire serve many functions unique to this device. The first is a cooking chamber that is large enough for smoking food. As someone skilled in the art knows, smoking food necessitates keeping the food away from the direct flames of the fire source. The three-in-one griller/smoker/fire accomplishes this in two ways. 1) The upper food grate 316 can be as much as fourteen inches away from the fire in some embodiments. 2) In addition, the fire box or base is large enough to build a fire source at only one end of the base 110, ensuring the smoking food will not come into direct contact with the flames. If configured as a food grill, food grate 216 allows the cook to use close direct contact with the fire to create grilled food. When configured as a fire pit, the base 110 can be used alone, or section 210 can be added to base 110 to support burning logs.

It can be appreciated that the user can place the three-in-one griller/smoker/fire pit on a stand, a table, an outdoor grill or use it on the ground level. Some embodiments of the three-in-one griller/smoker/fire pit can have attached legs upon which the device will stand.

Figure 3:
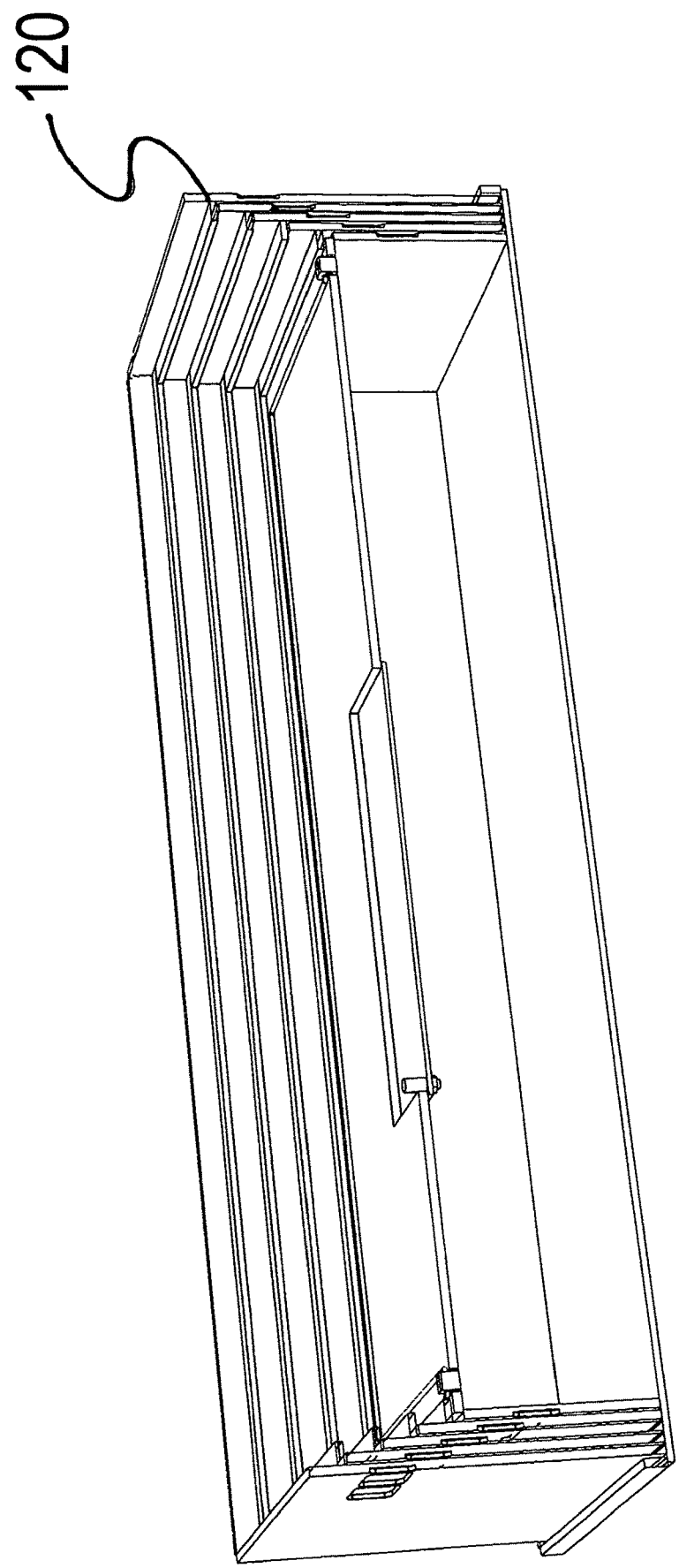
FIG. 3 is a perspective drawing of the embodiment in which the three-in-one griller/smoker/fire pit is nested into its portable configuration.
Figure 4:
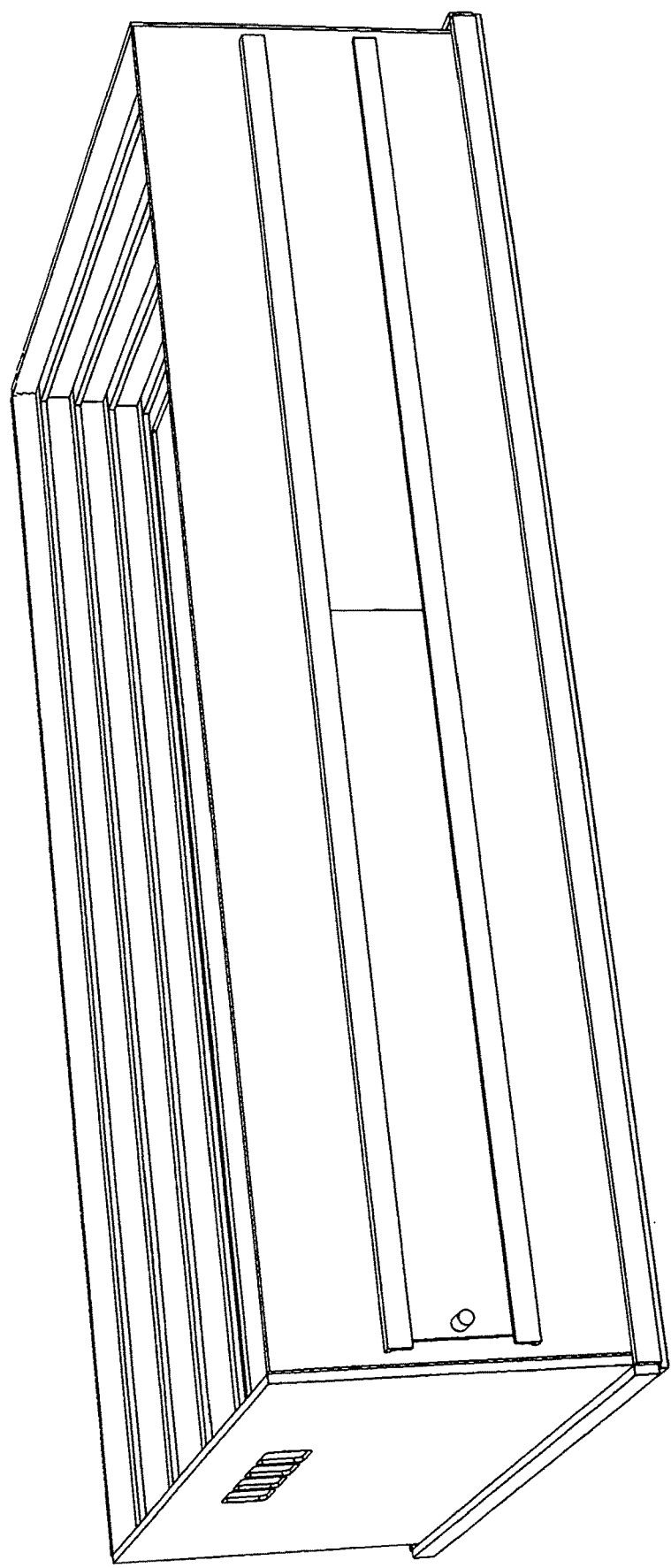
FIG. 4 is a cross sectional drawing of the embodiment showing how the various sections fit together in its portable configuration.

FIG. 3 is a perspective view of one embodiment of the portable three-in-one griller/smoker/fire pit. The embodiment is in its portable configuration in which the upper sections two through five are nested inside the base section 110. The grates are placed inside the floor section. The floor section 111 is latched to the base section 110 with latches 114 at either end of the base 110. Section five contains a handle 514 that is accessible on the top of the three-in-one griller/smoker/fire pit opposite from the latched floor. The handle 514 of section five 510 provides a convenient handle for transporting the nested portable three-in-one griller/smoker/fire pit.

Figure 5:
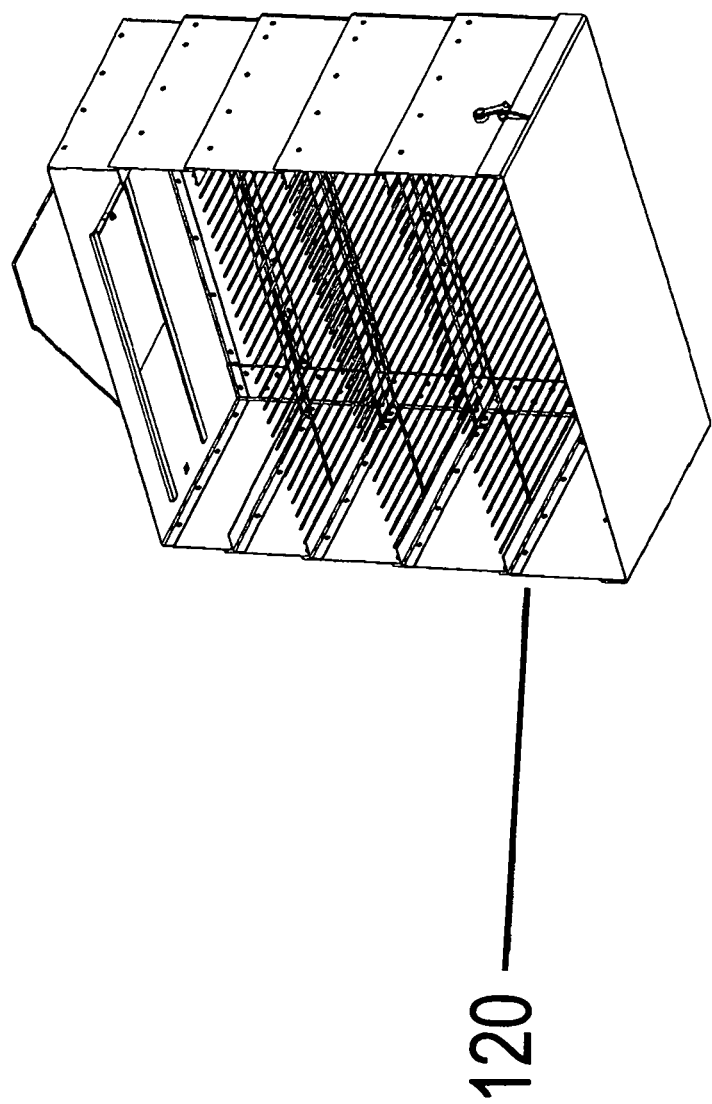
FIG. 5 is a detailed drawing of the inner ledge upon which rests the various grates and which support the section stacked above it.
Figure 6:
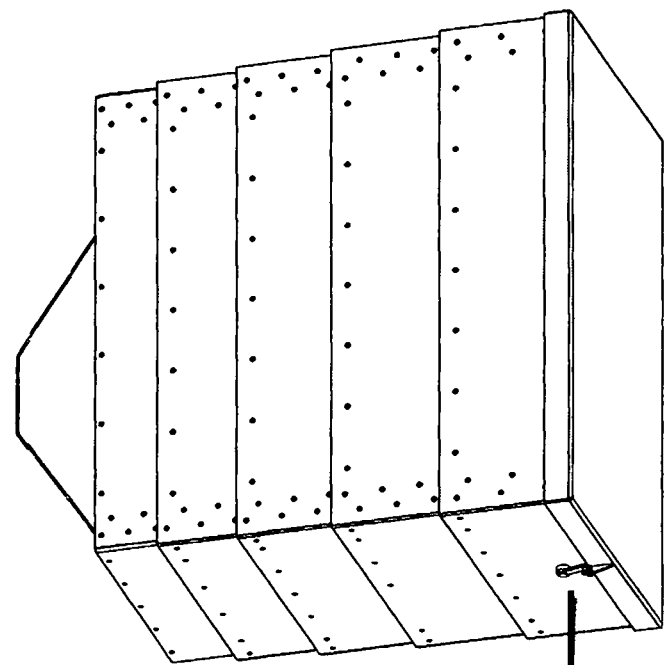
FIG. 6 is a detailed drawing of the air door of the base section and the latch between the base section 110 and the floor section.

In one embodiment the ledge FIG. 5 120 made a part of the base 110 and sections two through five is angled at 90 degrees from the inner wall. The angled ledge functions to create a tight fit between the various sections. In another embodiment, the ledge juts out at an upward angle. The amount of angle utilized can vary according to each embodiment.

In this embodiment, the base 110 has a sliding door 116 to control the air flow which in turn controls the inside temperature of the portable three-in-one griller/smoker/fire pit. It can be appreciated by those of the art, the means of adjusting the air inflow can vary. Some embodiments might use a round dial. Others might use a door that lifts away from the wall. Two doors could be used instead of one, either on the same side or opposite sides of the base 110. It will be appreciated by persons skilled in the art that the present invention is not limited by what has been particularly shown and described herein above. There is a multitude of ways to control the air flow into and out of the three-in-one griller/smoker/fire pit.

In this embodiment, the section 510 has a sliding door 516 to control the air flow which in turn controls the inside temperature of the portable three-in-one griller/smoker/fire pit. It can be appreciated by those of the art, the means of adjusting the air inflow can vary. Some embodiments might use a round dial. Others might use a door that lifts away from the wall. Two doors could be used instead of one, either on the top or on the side walls of section 510. It will be appreciated by persons skilled in the art that the present invention is not limited by what has been particularly shown and described herein above. There is a multitude of ways to control the air flow into and out of the portable three-in-one griller/smoker/fire pit.

Materials

One embodiment of the three-in-one griller/smoker/fire pit is made from stainless steel. The construction is made with a sheet metal press combined with bends and welds. The base and each subsequent section is bent, folded and welded as a separate component. The floor, base and subsequent sections nest into one another within specific tolerances. In this embodiment, the clearance tolerance between the second nesting section 210 and the base section 110 is one sixty forth of an inch or 0.0156 inch. Other sections share the same clearance tolerance. The clearance tolerance between the sliding door 116 and the outside wall of the base 1110 is 0.011 inch. The clearance tolerance between the sliding door 516 and the ceiling wall of the section 510 is 0.011 inch. In other embodiments of the three-in-one griller/smoker/fire pit, clearance tolerances can vary according to the needs and changes of the art.

Another embodiment of the three-in-one griller/smoker/fire pit is made from caste aluminum. Molten aluminum is poured into a temporary or permanent mold. Additional fittings are welded. In this embodiment, the clearance tolerance between the second nesting section 210 and the base section 110 is one sixty forth of an inch or 0.0156 inch. Other sections share the same clearance tolerance. The clearance tolerance between the sliding door 116 and the outside wall of the base 110 is 0.011 inch. The clearance tolerance between the sliding door 516 and the ceiling wall of the section 510 is 0.011 inch. In other embodiments of the three-in-one griller/smoker/fire pit, clearance tolerances can vary according to the needs and changes of the art.

In other embodiments, the three-in-one griller/smoker/fire pit can be made from other materials according to the needs of the art. The cited materials are for exemplary and are not meant to be restrictive or limiting of other possible embodiments.

Language of the Description

In the description and claims of the present application, each of the verbs, "comprise", "include" and "have", and conjugates thereof, are used to indicate that the object or objects, of the verb are not necessarily a complete listing of members, components, elements, or parts of the subject or subjects of the verb.

In this application the words "unit" and "section" "component" and "module" are used interchangeable. Anything designated as a unit or module may be a stand-alone unit or a specialized module. A unit or section may be modular allowing it to be easily removed and replaced with another similar unit or section.

VARIOUS EMBODIMENTS

The present invention has been described using detailed descriptions of embodiments thereof that are provided by way of example and are not intended to limit the scope of the invention. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons of the art.

It will be appreciated by persons skilled in the art that the present invention is not limited by what has been particularly shown and described herein above. Rather the scope of the invention is defined by the claims that follow.

What is claimed is:

1. A portable three-in-one griller/smoker/fire pit which can be configured and used as a food smoker, or food grill or fire pit with sections that nest into one another comprising: a four sided rectangular base defining a void within the base including an air vent slicing door; with a ledge angled from the side walls toward the interior void; a grate resting upon the ledge; multiple rectangular nesting sections containing ledges for support of a grate and additional sections above each section; with the top section containing an air vent sliding door and carrying handle; that becomes compact and portable when the sections are inverted and nested into the base, in which sections two, three, four and five are inverted and nested into the base section, wherein the grates of section two, three, and four rest in the floor of the base section, wherein the floor of the base section latches to two walls of the base section, wherein all sections nest together as one unit, wherein the ledges of each section act as a stop of the section below it, wherein the handle of section five is made to carry the nested sections as one piece.

2. The portable three-in-one griller/smoker/fire pit of claim one wherein the base and sections are fabricated from cast aluminum.

3. The portable three-in-one griller/smoker/fire pit of claim one wherein the base and sections are fabricated from stainless steel.

4. The portable three-in-one griller/smoker/fire pit of claim one wherein the grate is fabricated of carbon steel.

5. The portable three-in-one griller/smoker/fire pit of claim one wherein the base fits into and nests in a floor with latches such that the floor and the base can be latched together into one unit along with additional sections and grates.

6. The portable three-in-one griller/smoker/fire pit of claim one containing a second section defining a void of four sides resting upon the inner ledge of the base, which also contains a ledge extending into the inner void in the upper section, with a grate resting upon the ledge.

7. The portable three-in-one griller/smoker/fire pit of claim six wherein a third section defining a void of four sides rests upon the inner ledge of section two, containing a ledge in the upper section, with a grate resting upon the ledge.

8. The portable three-in-one griller/smoker/fire pit of claim seven wherein a forth section defining a void of four sides rests upon the inner ledge of section three, containing a ledge in the upper section.

9. The portable three-in-one griller/smoker/fire pit of claim eight wherein a fifth section defining a void of four sides with a ceiling that rests upon the inner ledge of section four, containing a ceiling such that it is closed on five sides and open on the bottom oriented toward the cooking chamber.

10. The portable three-in-one griller/smoker/fire pit of claim nine in which the ceiling contains a sliding door for air ventilation.

11. The portable three-in-one griller/smoker/fire pit of claim nine in which the ceiling contains a hinged handle that lays flush to the ceiling when not in use.

12. The portable three-in-one griller/smoker/fire pit of claim nine in which the ceiling contains a cooking thermometer that fits into and lays flush to the ceiling.

13. The portable three-in-one griller/smoker/fire pit of claim one in which the base section along with any plurality of additional sections can be stacked upon the ledge of the previous section, wherein any plurality of grates can be placed within the sections, thereby forming a cooking and smoking chamber.

14. The portable three-in-one griller/smoker/fire pit of claim one in which the base, along with any plurality of stacking sections can be constructed in a square shape.

15. The portable three-in-one griller/smoker/fire pit of claim one in which the base, along with any plurality of stacking sections can be constructed with a circular or oval shape.

16. The portable three-in-one griller/smoker/fire pit of claim one in which the base, along with any plurality of stacking sections can be constructed with three sides taking the shape of a triangle.

17. A portable three-in-one griller/smoker/fire pit of in which walls of sections stack one on top of the other to form an air tight cooking chamber; containing an air ventilation door in a base section below a fuel source and an air ventilation door in a topmost section such that air can only enter and exit through the ventilation door below and above the fuel source and cooking food, wherein the sections comprise at least five sections in which sections two, three, four and five are inverted and nested into the base section, wherein grates of section two, three, and four rest in floors of the base section, wherein the floor of the base section latches to two walls of the base section, wherein all sections nest together as one unit, wherein ledges of each section act as a stop of the section below it, wherein the handle of section five is made to carry the nested sections as one piece.

* * * * *